United States Patent
Wilde et al.

(10) Patent No.: US 11,698,319 B2
(45) Date of Patent: Jul. 11, 2023

(54) SAMPLING METER RESETTER AND PRESSURE TRANSMITTER COMBINATION

(71) Applicant: Kupferle, LLC, St. Louis, MO (US)

(72) Inventors: Kyle J. Wilde, Hillsboro, MO (US); Daniel C. Lorentz, Des Peres, MO (US)

(73) Assignee: Kupferle, LLC, St. Louis, MO (US)

(*) Notice: Subject to any disclaimer, the term of this patent is extended or adjusted under 35 U.S.C. 154(b) by 0 days.

(21) Appl. No.: 17/725,134

(22) Filed: Apr. 20, 2022

(65) Prior Publication Data

US 2022/0334015 A1   Oct. 20, 2022

Related U.S. Application Data

(60) Provisional application No. 63/177,087, filed on Apr. 20, 2021.

(51) Int. Cl.
  *G01L 19/08* (2006.01)
  *G01L 19/14* (2006.01)
  *G01M 3/26* (2006.01)

(52) U.S. Cl.
  CPC .......... *G01L 19/086* (2013.01); *G01L 19/14* (2013.01); *G01M 3/26* (2013.01)

(58) Field of Classification Search
  None
  See application file for complete search history.

(56) References Cited

U.S. PATENT DOCUMENTS

| | | | |
|---|---|---|---|
| 4,691,727 A | 9/1987 | Zorb et al. | |
| 4,940,976 A | 7/1990 | Gastouniotis et al. | |
| 4,967,788 A | 11/1990 | Miller | |
| 5,298,894 A | 3/1994 | Cerny et al. | |
| 5,517,859 A * | 5/1996 | Goheen | G01L 19/0007 73/756 |
| 7,574,896 B1 * | 8/2009 | Cooper | G01M 3/2815 73/40.5 R |
| 7,880,641 B2 | 2/2011 | Parris et al. | |
| 8,109,297 B2 | 2/2012 | Cimberio et al. | |
| 8,378,846 B2 | 2/2013 | Olson et al. | |
| 9,927,277 B1 | 3/2018 | Lorentz et al. | |
| 10,060,775 B2 | 8/2018 | Ruiz Cortez | |
| 10,180,414 B2 | 1/2019 | Clark et al. | |
| 2008/0149180 A1 * | 6/2008 | Parris | F16K 27/12 700/282 |
| 2008/0150750 A1 * | 6/2008 | Parris | G01D 11/245 73/201 |

OTHER PUBLICATIONS

Kupferle Foundry Company, Eclipse 9497-A/9497-B Hydrants; http://web.archive.org/web/20170331191519/http://hydrants.com:80/9497a9497b, 2017, pp. 1-8, St. Louis, MO.

(Continued)

*Primary Examiner* — Octavia Davis Hollington
*Assistant Examiner* — Jermaine L Jenkins
(74) *Attorney, Agent, or Firm* — Sandberg Phoenix & von Gontard PC

(57) ABSTRACT

A pressure transmitter is mounted to the sampling output of a sampling meter resetter. The pressure transmitter and the sampling meter resetter are mounted in a subterranean meter box. In embodiments, the pressure transmitter is removably mounted to a spring-loaded sampling valve.

16 Claims, 4 Drawing Sheets

(56) References Cited

OTHER PUBLICATIONS

A.Y. Mcdonald Mfg. Co., Water Sampling Just Got Easier, Water Works, https://www.aymcdonald.com/post/water-sampling-just-got-easier, 2021, pp. 1-3, Dubuque, Iowa.
Kupferle Foundry Company, MainGuard #94WM Sampling Station brochure, www.hydrants.com, Nov. 13, 2018, pp. 1-3, St. Louis, MO.
Kupferle Foundry Company, MainGuard #95WM Sampling Station Brochure, www.hydrants.com, Jan. 27, 2019, pp. 1-3, St. Louis, MO.
Sitron USA, User Manual, Series: SP Pressure Transmitters, Aug. 2016, pp. 1-27, Hauppauge, NY.
Kupferle Foundry Company, #Z94PR Cut Sheet, Nov. 18, 2018, 1 page, St. Louis, MO.

\* cited by examiner

SAMPLING METER RESETTER AND PRESSURE TRANSMITTER COMBINATION

CROSS-REFERENCE TO RELATED APPLICATIONS

This application claims the benefit of U.S. Provisional Application 63/177,087, filed Apr. 20, 2021, the entire contents of which, including the Appendices, are hereby incorporated by reference.

STATEMENT REGARDING FEDERALLY SPONSORED RESEARCH

Not applicable.

BACKGROUND OF THE INVENTION

Monitoring of subterranean water systems, such as municipal drinking water systems, is a longstanding and increasingly important task. One indication of a leak in the system is a drop in pressure in the vicinity of the leak. A drop in pressure may also be an indication of the failure of a pump. Therefore, it has been recognized as desirable to monitor pressure widely throughout the system. One proposed approach has been to install pressure transmitters in fire hydrants or flushing hydrants throughout the system, each equipped with a data transmission system to transmit pressure data to a central location. That approach, however, involves extensive modification of existing hydrants, particularly in climates where freezing is a problem and hydrant barrels are normally dry.

BRIEF SUMMARY OF THE INVENTION

In accordance with an embodiment of the present invention, a pressure transmitter is mounted to a meter resetter. Such resetters are frequently mounted in a meter box, generally below ground level.

Many resetters include a threaded access port on the street side of the resetter, which may accept a sampling port for drawing samples of water by opening a manual valve. Examples are found in Lorentz, et al., U.S. Pat. No. 9,927,277, assigned to the same assignee as the present application, Cimbero, et al., U.S. Pat. No. 8,109,297, Miller, U.S. Pat. No. 4,967,788, and Zorb, et al., U.S. Pat. No. 4,691,727. Illustrative commercial embodiments include the Kupferle Model 94WM, the Kupferle Model 95WM, and the A.Y. McDonald Mfg. Co. Series 710 sampling stations, described at www.aymcdonald.com/post/water-sampling-just-got-easier. Some manufacturers sell "meter setters" or "meter insetters" which include an access port. All such meter setters, insetters, and resetters are included in the term "sampling resetter" as used herein.

In accordance with an embodiment of the invention, the access port of a sampling resetter is utilized to mount an electrically powered pressure transmitter having an electrical output. The output of the pressure transmitter is transmitted wirelessly to a remote receiver.

In embodiments, the pressure transmitter is mounted directly to the access port of a sampling resetter.

In embodiments, a sampling valve is mounted to the access port, and the pressure transmitter is attached to the sampling valve.

In embodiments, a sampling valve is mounted in a meter box or other subterranean enclosure, as to an adapter substituted for the meter in a meter setter or resetter, and the pressure transmitter is mounted to the sampling valve.

In embodiments, the sampling valve is a spring-loaded, self-closing valve with an external mount such as threads or a bayonet connector, and the pressure transmitter is removably mounted to the external mount.

BRIEF DESCRIPTION OF THE DRAWINGS

Corresponding reference numerals will be used throughout the several figures of the drawings.

DETAILED DESCRIPTION

Figure 1:
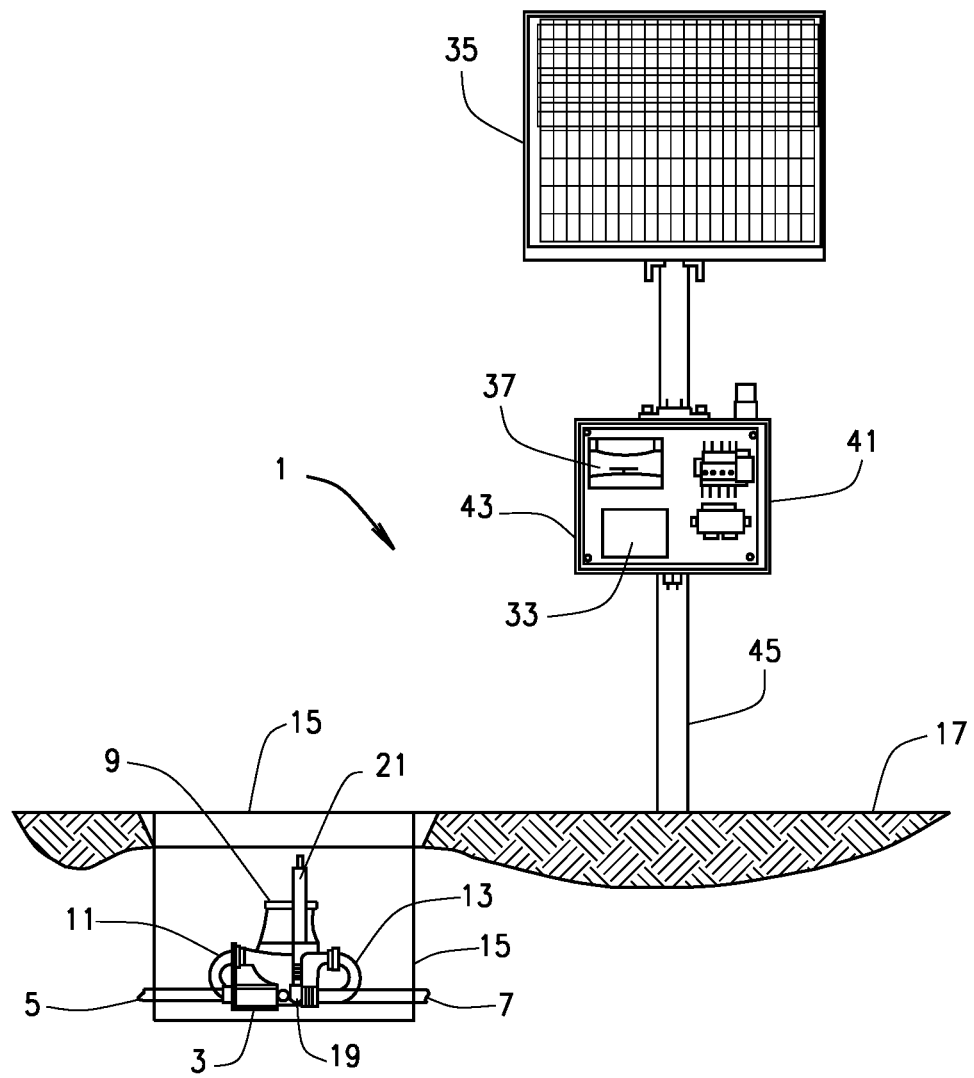
FIG. 1 is a view in front elevation, partially broken away, of a pressure transmitter system in accordance with a first illustrative embodiment of the invention.

The following detailed description illustrates the claimed invention by way of example and not by way of limitation. This description will clearly enable one skilled in the art to make and use the claimed invention, and describes several embodiments, adaptations, variations, alternatives, and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Referring now to the drawings, and in particular to FIG. 1, reference numeral 1 indicates a first illustrative embodiment of the invention. A sampling resetter 3 is illustratively a Kupferle Mainguard #95WM, available commercially from Kupferle Foundry Company, St. Louis, Mo. The Mainguard #95WM is a commercial embodiment of the meter resetter disclosed and claimed in Lorentz, et al., U.S. Pat. No. 9,927,277. The sampling resetter 3 is connected to a water main (street) inlet 5 and a customer side outlet 7 of a subterranean water system. The sampling resetter 3 carries a water meter 9 between horns 11 and 13. The sampling resetter 3, and meter 9 are located in a buried meter box 15 extending below ground line 17. The foregoing construction is conventional.

Figure 2:
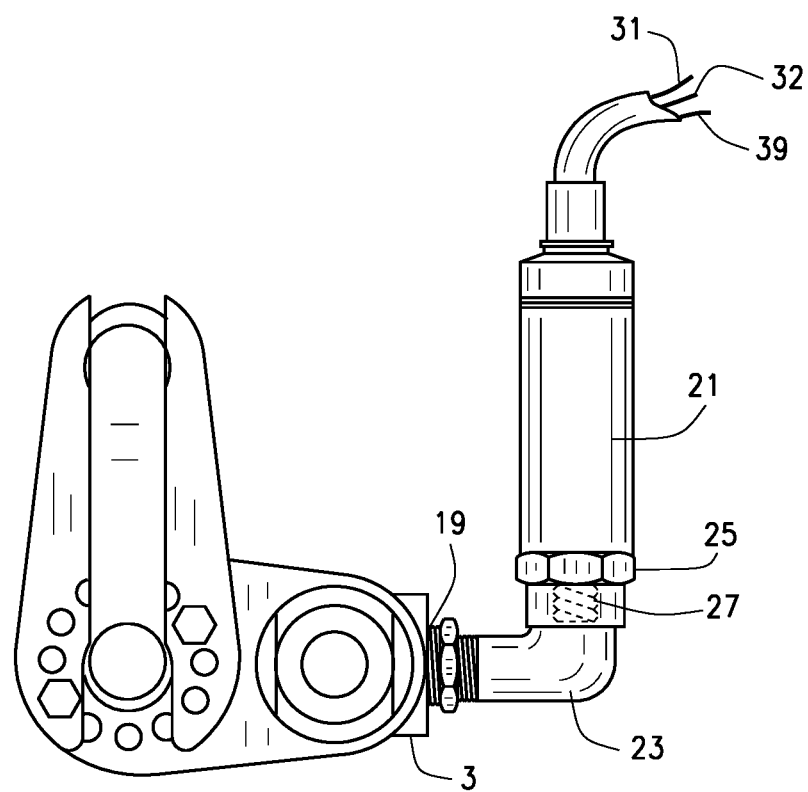
FIG. 2 is a view in left side elevation of a sampling meter resetter combined with a pressure transmitter in accordance with the first illustrative embodiment of the invention.

As shown more particularly in FIG. 2, in accordance with the first embodiment of the invention a pressure transmitter 21 is threaded into a street-side access port 19 of the sampling resetter 3 through an elbow 23. The pressure transmitter 21 is illustratively a submersible pressure transmitter with a threaded inlet, sold by Sitron USA, Hauppauge, N.Y., as its model SP68, described in detail in Sitron User Manual, Series: SP, identified as SP_06_2016. The pressure transmitter 21 includes a hexagonal fitting 25 and threaded hollow stem 27 formed at the bottom of its body. The pressure transmitter 21 is powered by a twelve- to thirty-volt DC source through wires 31 and 32. The source is illustratively a battery or battery pack 33 charged by a solar panel 35 through a solar charge controller 37, as shown in FIG. 1. The output of the transmitter is illustratively a 4-20 mA signal carried by wires 39. The output may be read as an analog value or may be converted to a digital signal, as by using a HART modem, and transmitted by a cellular communication device 41 to a remote central receiver or to the cloud for storage and retrieval. The meter 9, meter resetter 3, and pressure transmitter 21 are all contained within the buried meter box 15. The battery 33, controller 37, and cellular communication device 41 are all contained in an electrical enclosure 43, and the wires 31, 32, and 39 are run to the enclosure 43. The solar panel 35 and electrical enclosure 43 are mounted on a mast 45 set in the ground. The output signal may additionally be displayed or stored locally, within the meter box or electrical enclosure.

Many utilities (municipal water systems) have adopted automated water meter reading systems which enable meters to be read remotely. Some of these are automatic reading (AMR) systems having one-way communication with a passing vehicle equipped to receive signals at relatively close range (say, 5-50 feet). Others are advanced metering infrastructure (AMI) system having two-way communication between the meters in the system and a central control system. In either of these systems, the readings from the pressure transmitter may be integrated into the signal sent from the meter. Such systems are commercially available from Badger Meter, Inc., Milwaukee, Wis., under the trademark ORION® or Neptune Technology Group, Inc., Tallassee, Ala., under the trademark TRICON/E®3. They are described, for example in Olson, et al., U.S. Pat. No. 8,378,846, Cerny, et al., U.S. Pat. No. 5,298,894, Gastouniotis, et al., U.S. Pat. No. 4,940,976, Cortez, U.S. Pat. No. 10,060,775, Clark, et al., U.S. Pat. No. 10,180,414, Paris, et al. U.S. Pat. No. 7,880,641.

In a municipal water system using the pressure sensing system of the invention, many or all of the meters in the system are already mounted to a sampling resetter. It is therefore necessary only to shut off the water to each meter briefly, remove the plug from the main-side access port of the resetter (of whatever type), and thread the pressure transmitter into the access port.

In this way, pressure at each meter, or at selected meters, may be continuously or periodically checked remotely, and problems with leakage throughout the subterranean water system identified before they become major breaks.

Figure 3:
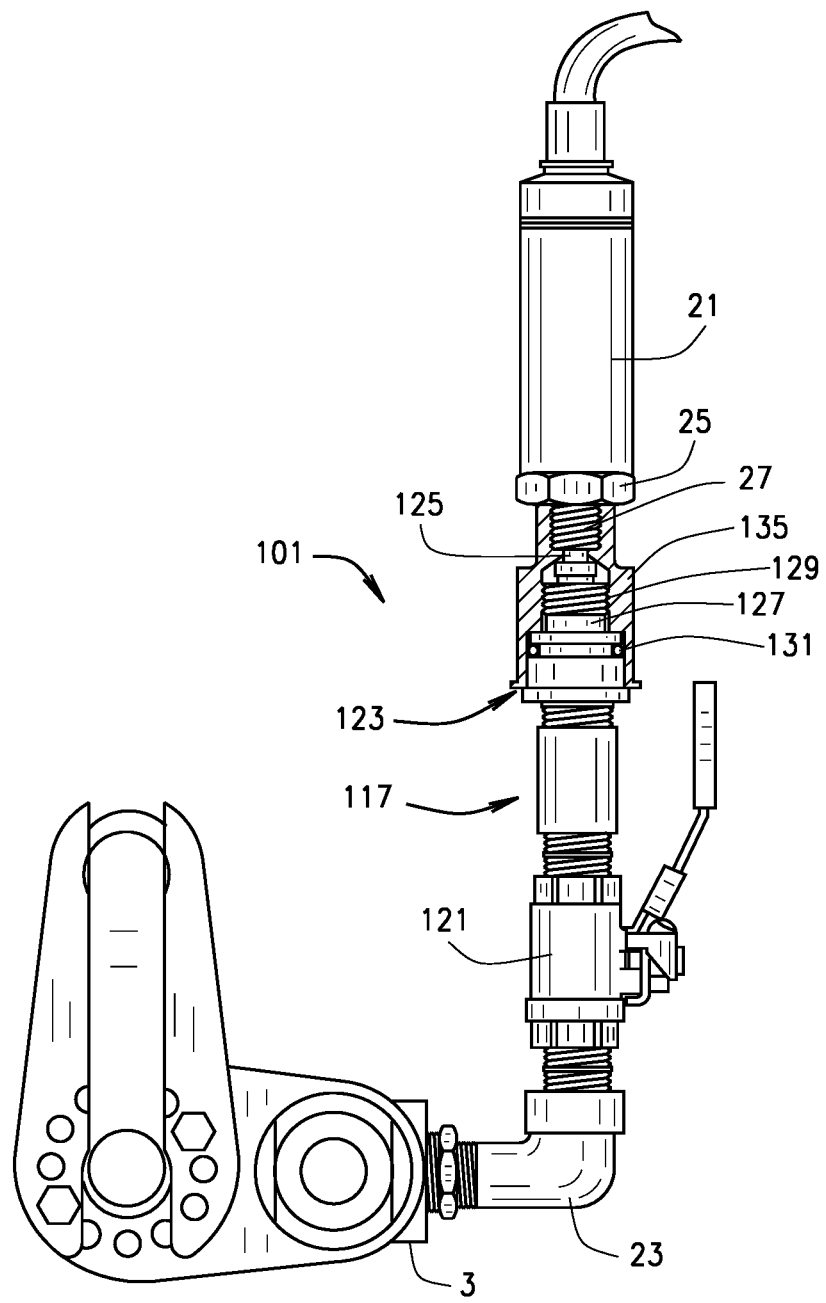
FIG. 3 is a view in left side elevation of a sampling meter resetter combined with a pressure transmitter in accordance with a second illustrative embodiment of the invention.

A second embodiment 101 of the invention is shown in FIG. 3. In this embodiment, a sampling valve assembly 117 is previously mounted to the street (main) side access port 19 through street elbow 23. The sampling valve assembly 117 is illustratively a Kupferle Foundry X94WM sampling station assembly. The sampling valve assembly 117 includes an optional manually operated ball valve 121, and a spring-loaded sampling valve 123, all connected to each other with appropriate couplings. The sampling valve 123 includes a plunger 125 slidably mounted in a body 127 and biased upward into a closed position. The exterior of the body 127 is threaded as shown at 129. This configuration of a sampling resetter 3 allows water samples to be taken with a hollow sampling rod having an adapter at its lower end. The sampling rod and its adapter are not shown but are widely known; Kupferle Foundry #Z94PR is one such sampling rod. The adapter is internally threaded, so that screwing the adapter onto the sampling valve body 127 depresses the plunger 125, opens the valve 123, and allows water to flow into the hollow sampling rod. An O-ring 131 on the body 127 ensures that the adapter is sealed to the sampling valve 123 before the valve is opened.

In this second embodiment of the invention, the pressure transmitter 21 is provided with an adapter 135 shaped internally like the unshown adapter of the sampling rod. The pressure transmitter 21 is thus attached to the pre-existing sampling valve 123 simply by screwing it onto the sampling valve 123, without requiring shutting off the water to the sampling resetter 3. In this embodiment, the pressure transmitter 21 and adapter 135 must be unscrewed from the sampling valve 123 before taking a water sample, but the system in other respects functions in the same manner as the first embodiment. The pressure transmitter 21 may be removed with a wrench (not shown) applied to the hexagonal fitting 25. Alternatively, a special purpose wrench (not shown) which grasps the pressure transmitter 21 as it is unscrewed from the sampling valve 123 may be utilized, or the pressure transmitter 21 may be housed in a fitting (not shown) permitting easy removal of the pressure transmitter 21. When a sample has been taken, the pressure transmitter 21 is easily screwed back onto the sampling valve 123.

Figure 4:
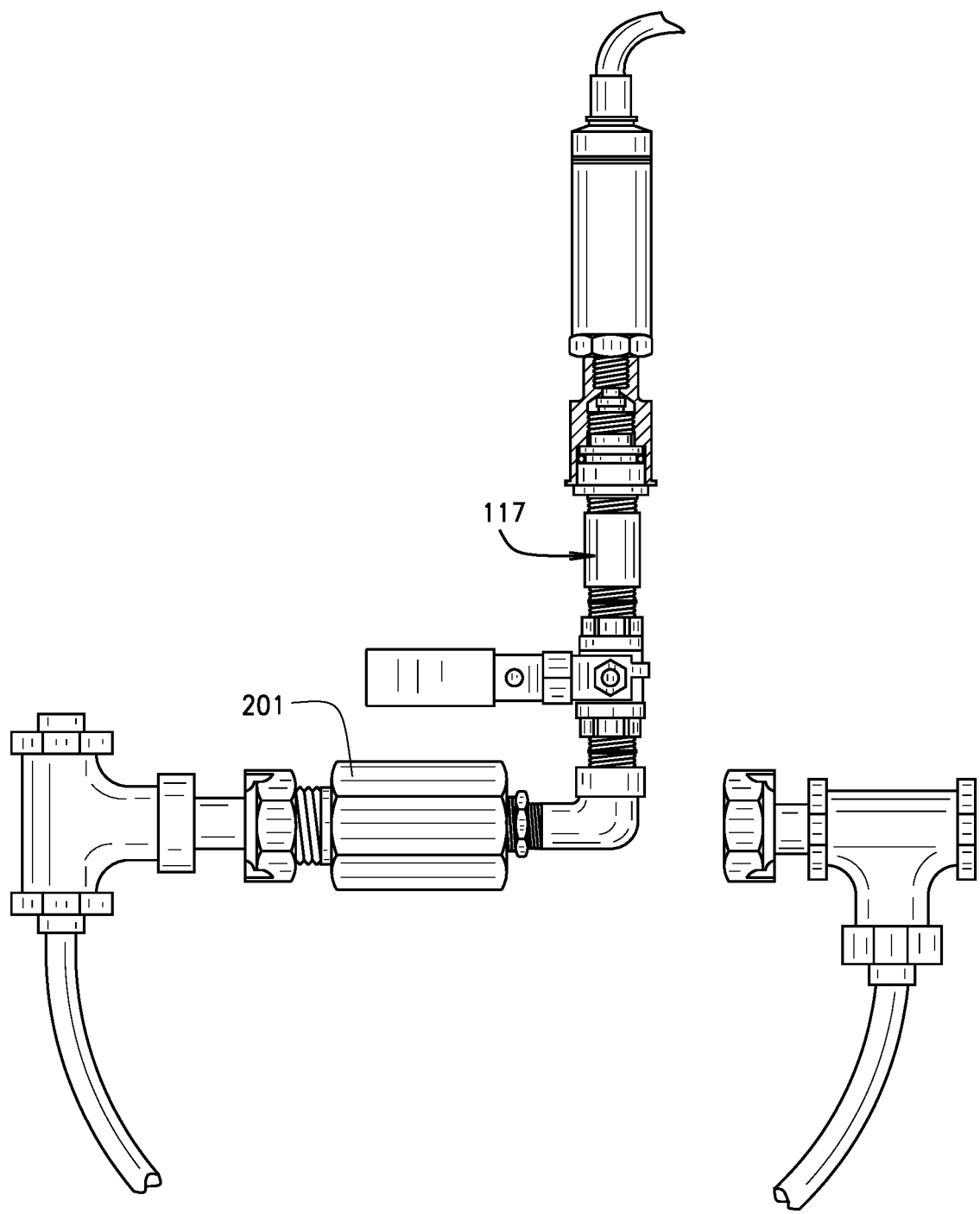
FIG. 4 is a view in front elevation of an idler and a pressure transmitter in accordance with a third embodiment of the invention.

In a third embodiment, shown in FIG. 4, a pressure transmitter 21 is mounted, in a buried meter box, to a sampling valve 117 attached to an idler 201. The idler 201 is illustratively a PVC spacer with a central bore extending through it. The idler 201 is substituted for a meter in a meter setter or resetter. This embodiment is in other respects the same in structure and operation as the second embodiment. This embodiment allows a water utility to utilize infrastructure that may be out of service. Because this embodiment does not include a meter and its associated telemetry circuits, the pressure transmitter 205 requires its own power supply and output signal wireless transmitter.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Merely by way of example, a sampling valve may be mounted to the access port in parallel with the pressure transmitter, or a separate outlet may be provided in the resetter body for a sampling valve. In the third embodiment, the idler may include an extension attached to the downstream horn of the meter setter, and the sampling valve may be attached to a bore in the side of the idler. In all embodiments, other water condition sensor/transmitters may be substituted for the pressure transmitter. In situations in which remote transmission is not feasible, a data logger may be attached to the pressure transmitter and read manually to provide a history of pressure at the site. These variations are merely illustrative.

All patents, published patent applications, and literature mentioned herein are hereby incorporated by reference.

The invention claimed is:

1. In combination, a sampling meter resetter, the sampling meter resetter having a body with an access port, a pressure transmitter mounted to the access port, and a water meter mounted to the sampling meter resetter, the water meter comprising an AMI or an AMR remote reading system, the pressure transmitter communicating with the AMI or AMR remote reading system.

2. The combination of claim 1 wherein a sampling valve is mounted to the access port, and the pressure transmitter is mounted to the sampling valve.

3. The combination of claim 1 wherein the sampling meter resetter, the water meter, and the pressure transmitter are all housed in a subterranean meter box.

4. In combination, a sampling meter resetter, the sampling meter resetter having a body with an access port, a sampling valve mounted to the access port, the sampling valve comprising a valve body biased into engagement with a valve seat, and a pressure transmitter mounted to the sampling valve, the pressure transmitter comprising an adapter sized and constructed to move the valve body away from the valve seat when the pressure transmitter is mounted to the sampling valve.

5. The combination of claim 4 wherein the sampling valve comprises a housing having external threads, the adapter comprising internal threads mating with the external threads.

6. The combination of claim 4 further comprising a water meter mounted to the sampling meter resetter, the water meter comprising an AMI or an AMR remote reading system, the pressure transmitter communicating with the AMI or AMR remote reading system.

7. The combination of claim 4 wherein the sampling meter resetter and the pressure transmitter are housed in a subterranean meter box.

8. In combination,
a subterranean sampling valve attached to a subterranean water system, the subterranean sampling valve comprising a spring-loaded valve,
a water condition transmitter attached to the spring-loaded valve and holding the spring-loaded valve open, and
an enclosure enclosing the subterranean sampling valve and the pressure water condition-transmitter.

9. The combination of claim 8 wherein the subterranean sampling valve comprises a plunger slidably mounted in a body, the spring-loaded valve being openable by depressing the plunger.

10. The combination of claim 9 wherein the body has an exterior coupling, the water condition transmitter having an adapter formed and sized to engage the exterior coupling and depress the plunger.

11. The combination of claim 8 further comprising a water meter mounted in the enclosure, the water meter comprising a remote reading system, the pressure transmitter communicating with the remote reading system.

12. The combination of claim 11 wherein the remote reading system is an AMI or an AMR remote reading system.

13. The combination of claim 8 wherein the water condition transmitter is a pressure transmitter.

14. The combination of claim 8 wherein the water condition transmitter is wired to a wireless transmitter.

15. In combination, a sampling meter resetter, the sampling meter resetter having a body with an inlet and an outlet, a water meter connected between the inlet and the outlet of the body, an access port in the body, a pressure transmitter mounted to the access port, a power source electrically attached to the pressure transmitter, and a signal transmitter electrically attached to the pressure transmitter.

16. The combination of claim 15 wherein the sampling meter resetter, the water meter, and the pressure transmitter are all housed in a subterranean meter box.

* * * * *

UNITED STATES PATENT AND TRADEMARK OFFICE
CERTIFICATE OF CORRECTION

| | |
|---|---|
| PATENT NO. | : 11,698,319 B2 |
| APPLICATION NO. | : 17/725134 |
| DATED | : July 11, 2023 |
| INVENTOR(S) | : Daniel C. Lorentz and Kyle J. Wilde |

It is certified that error appears in the above-identified patent and that said Letters Patent is hereby corrected as shown below:

In the Claims

Claim 8 - Column 5, Line 31 - "and the pressurc [sic] water condition transmitter" should read as "and the water condition transmitter".

Signed and Sealed this
Seventeenth Day of October, 2023

Katherine Kelly Vidal
*Director of the United States Patent and Trademark Office*